US010780796B2

(12) United States Patent
Reckziegel et al.

(10) Patent No.: US 10,780,796 B2
(45) Date of Patent: Sep. 22, 2020

(54) METHOD FOR RECOGNIZING A SEAT OCCUPANCY

(71) Applicant: Robert Bosch GmbH, Stuttgart (DE)

(72) Inventors: Bastian Reckziegel, Kirchheim/Nabern (DE); Johannes Ludwig Foltin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 340 days.

(21) Appl. No.: 15/885,403

(22) Filed: Jan. 31, 2018

(65) Prior Publication Data
US 2018/0222346 A1    Aug. 9, 2018

(30) Foreign Application Priority Data
Feb. 8, 2017 (DE) .................. 10 2017 201 965

(51) Int. Cl.
| *B60N 2/00* | (2006.01) |
| *B60R 1/00* | (2006.01) |
| *B60R 22/48* | (2006.01) |
| *B60N 2/02* | (2006.01) |
| *B60N 2/56* | (2006.01) |

(52) U.S. Cl.
CPC ............. *B60N 2/002* (2013.01); *B60R 1/00* (2013.01); *B60R 22/48* (2013.01); *B60N 2/02* (2013.01); *B60N 2/56* (2013.01); *B60R 2022/4808* (2013.01); *B60R 2022/4816* (2013.01); *B60R 2022/4858* (2013.01); *B60R 2022/4866* (2013.01); *B60R 2300/8006* (2013.01)

(58) Field of Classification Search
CPC .. B60N 2/002; B60N 2/02; B60N 2/56; B60R 1/00; B60R 22/48; B60R 2022/4858; B60R 2022/4866; B60R 2022/4808; B60R 2300/8006; B60R 2022/4816; B60R 21/01516; B60R 21/0153; B60R 21/01534; B60R 21/01538; B60R 21/01544
USPC ............................................. 701/45
See application file for complete search history.

(56) References Cited

U.S. PATENT DOCUMENTS

| 2002/0019213 | A1* | 2/2002 | Yoshinori | B60H 1/00742 454/155 |
| 2004/0176891 | A1* | 9/2004 | Christl | B60N 2/002 701/45 |
| 2005/0197754 | A1* | 9/2005 | Bettwieser | B60R 21/01516 701/45 |
| 2007/0251749 | A1* | 11/2007 | Breed | B60J 10/00 180/273 |
| 2009/0082926 | A1* | 3/2009 | Klein | B60R 22/48 701/45 |
| 2015/0165932 | A1* | 6/2015 | Maley | B60N 2/002 340/457 |

(Continued)

FOREIGN PATENT DOCUMENTS

| DE | 102007060000 A1 | 6/2008 |
| DE | 102010002861 A1 | 9/2011 |
| DE | 102012216082 A1 | 3/2014 |

*Primary Examiner* — Bao Long T Nguyen
*Assistant Examiner* — Jean W Charleston
(74) *Attorney, Agent, or Firm* — Norton Rose Fulbright US LLP; Gerard Messina

(57) ABSTRACT

A method for recognizing a seat occupancy of seats in a motor vehicle including a) preparing a checking sequence of the seats at least using a probability of occupancy of the seats, and b) sequentially checking the occupancy of the seats using the checking sequence prepared in step a).

18 Claims, 1 Drawing Sheet

(56) References Cited

U.S. PATENT DOCUMENTS

| | | | |
|---|---|---|---|
| 2015/0239573 A1* | 8/2015 | Jouper | B64D 11/0015 |
| | | | 701/3 |
| 2016/0368398 A1* | 12/2016 | Fujii | B60N 2/002 |
| 2017/0320463 A1* | 11/2017 | Saitou | B60R 21/01512 |
| 2018/0079322 A1* | 3/2018 | Tanriover | B60N 2/0248 |
| 2018/0266844 A1* | 9/2018 | Heo | G01C 21/3438 |

\* cited by examiner

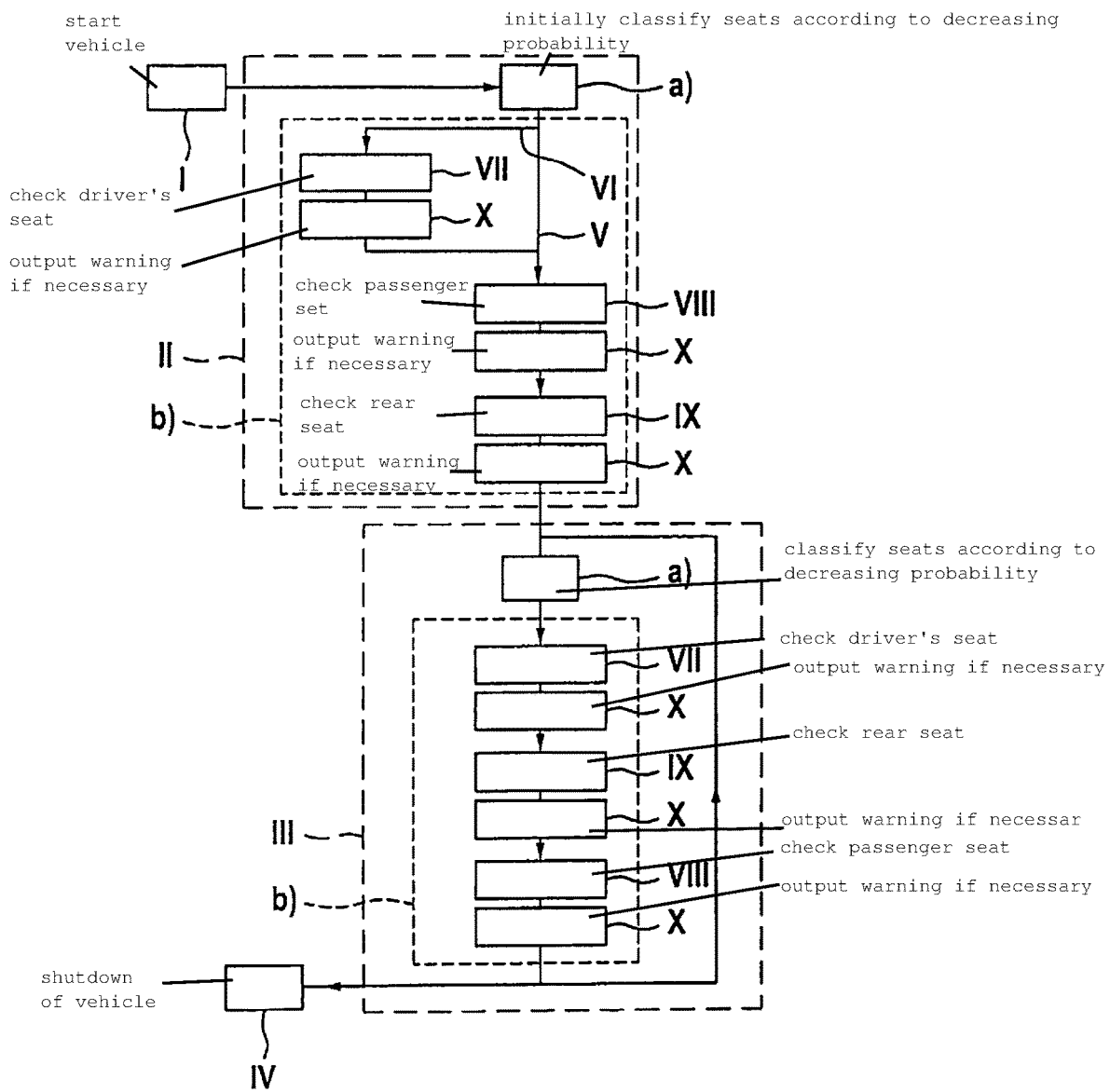

METHOD FOR RECOGNIZING A SEAT OCCUPANCY

CROSS REFERENCE

The present application claims the benefit under 35 U.S.C. § 119 of German Patent Application No. DE 102017201965.4 filed on Feb. 8, 2017, which is expressly incorporated herein by reference in its entirety.

BACKGROUND INFORMATION

The present invention relates to a method for recognizing a seat occupancy, in particular of seats in a motor vehicle. The recognition of the seat occupancy may be taken into consideration upon the triggering of safety systems in particular in the case of a collision of the motor vehicle with a collision object. The information about the seat occupancy may thus contribute to the safety of occupants of the motor vehicle.

Modern vehicles regularly have a warning function, which recognizes whether an occupant is not wearing a seatbelt. It is not only checked whether a belt buckle is closed. Further pieces of information are also evaluated, to recognize whether a seat is occupied. Only if this is the case is a warning signal output if a belt buckle is not closed. Furthermore, conventional system may take the information of the seat occupancy into consideration when triggering safety systems, for example, airbags.

However, conventional methods for recognizing a seat occupancy in a motor vehicle regularly require a very large computing effort and/or a costly sensor system.

SUMMARY

A particularly advantageous method for recognizing a seat occupancy in a motor vehicle is provided. Particularly advantageous refinements of the method are described herein.

A seat occupancy is to be understood here in particular as a piece of information about whether a person is sitting on a seat or not. In addition, the term seat occupancy in the definition used here also includes pieces of information on the type of seat occupancy, for example, a weight of a person on a seat. It is thus possible to differentiate in particular, for example, between adults, children, baby seats, and objects on a seat.

The safety of the occupants of the motor vehicle may be enhanced using the information about which seat of a motor vehicle is occupied (and how this seat is occupied). For example, a warning signal may be output if a seat is recognized as occupied, but the belt buckle of the particular seat is not closed. The seat occupancy may also be taken into consideration when triggering restraint systems in the event of an accident. In particular, pieces of information about the type of the seat occupancy may also be used. For example, if a child sits on a seat, restraint systems may be triggered in a different manner than if an adult sits on the seat. If a baby seat is recognized on the passenger seat, for example, the triggering of a passenger airbag is preferably suppressed. The described method may enable the seat occupancy to be recognized particularly quickly using a particularly small computing effort. The described method may contribute in particular to utilizing computing capacities particularly efficiently.

According to the described method, the occupancy of the individual seats of the motor vehicle is preferably checked in succession. It is particularly preferred that a seat is checked only after a prior check of another seat has been completed (if the checked seat is not the first seat). In the case of such a check, a result of the check may already be output and/or processed for a seat before the entire check is completed. Therefore, partial results of the check may be obtained particularly quickly in any case. The checking of the seats takes place in the checking sequence prepared in step a).

In step a), probabilities of occupancy of the seats to be checked are preferably initially provided. The seats of the motor vehicle are preferably ordered in principle according to decreasing probability of occupancy, whereby the checking sequence is prepared. However, there may be deviations from such an established checking sequence. In particular, it is preferred not to classify seats having a very high probability of occupancy (in particular seats having a probability of occupancy above a predefined limiting value) into the checking sequence according to the probability of occupancy, but rather to place them at the end of the checking sequence, contrary to the arrangement of the seats according to the decreasing probability of occupancy. This applies in particular to the driver's seat, which is always occupied at least in conventional motor vehicles. The driver's seat is preferably checked last or not at all. In many motor vehicles, for example, in contrast to the remaining seats, no weight sensor is provided in the driver's seat, via which a seat occupancy could be recognized, because the driver's seat may be assumed to be occupied during the entire operation of the motor vehicle. A corresponding warning signal for an unbuckled belt is preferably output if the belt buckle of the driver is not closed. In this case, a check of the occupancy of the driver's seat is not awaited. In motor vehicles which at least partially enable autonomous driving (i.e., without intervention by a driver), the driver's seat does not have to be occupied during the entire operation of the motor vehicle. In this case, it is preferred that the driver's seat is also taken into consideration in the checking sequence as the remaining seats and in particular that the driver's seat is checked first.

It may also be taken into consideration in the preparation of the checking sequence how important the knowledge of the occupancy of the particular seats is. There may be a legal requirement, for example, that the seat occupancy of the passenger seat has to be recognized at the latest after a predefined time has elapsed since startup of the motor vehicle. Such a regulation may be used in particular to suppress the triggering of a passenger airbag if a baby seat is located on the passenger seat. The knowledge of the seat occupancy of the passenger seat may accordingly be particularly important. In the case of the driver's seat, in contrast, it may be assumed that it is always occupied. The knowledge of the seat occupancy of the driver's seat may thus be considered to be less important, because this is already known as a nearly certain assumption.

Furthermore, it is preferred that a difference of the probability of occupancy from a reference probability is ascertained for each seat (or at least for a part of the seats), and that the seats are classified into the checking sequence according to this difference. A value of 50% may be predefined as the reference probability, for example. Seats which are occupied 50% of the time are accordingly checked first. Seats which are occupied 90% of the time are checked later, precisely as seats with 10% probability of occupancy, because a reliable assumption about the seat occupancy exists for them and therefore the knowledge of the actual seat occupancy is less important.

Furthermore, it is preferred that a mean information content of the knowledge of the seat occupancy of the seat is ascertained for each seat (or at least for a part of the seats), and that the seats are classified into the checking sequence according to this mean information content. This procedure is similar to the above-described difference method, in this embodiment, a particularly precise ascertainment of the checking sequence being possible by way of an evaluation of the mean information content. The relevant information may thus be ascertained and provided already early in the evaluation. This procedure may be advantageous in particular if the result of the evaluation may assume more than two values (for example, not occupied, occupied with baby seat, occupied with adult).

Preferably, all seats of the motor vehicle with the exception of the driver's seat are checked using the described method. Alternatively, it is preferred that all seats of the motor vehicle are checked. As a further alternative, it is preferred that only some of the seats of the motor vehicle are checked.

The checking sequence is preferably permanently specified. The checking sequence may read, for example, according to a supposed probability of occupancy and a deviation for the driver's seat: passenger seat, seat behind the passenger seat, seat behind the driver's seat, seat in the middle of a rear bench, driver's seat. First, the seat which is most probably occupied (which is not the driver's seat) is checked, so that for this seat, for example, a warning signal may be output first if the belt is not worn. It is preferably taken into consideration in the establishment of the checking sequence whether the driver sits on the left or the right side of the motor vehicle (i.e., whether the motor vehicle is a left-hand drive car or a right-hand drive car).

Furthermore, it is preferred that the checking sequence is adapted to pieces of information, from which the seat occupancy may be inferred. For this purpose, any piece of information which is available in a control unit of a motor vehicle may be used and interpreted. The checking sequence may also be dynamically changed. This means that after a check has already taken place according to step b), another checking sequence may be established for a subsequent check.

After the checking sequence has been established in step a), it is preferably recognized in step b), using the checking sequence prepared in step a), which seat is occupied. For this purpose, it is preferably checked sequentially (i.e., for one seat after another) whether a seat is occupied. The checking in step b) is preferably carried out using sensors in the motor vehicle.

In one preferred specific embodiment of the method, measurement data are obtained prior to step b), which are evaluated in step b) for checking the occupancy.

In another preferred specific embodiment, steps a) and b) are periodically carried out in succession, wherein the next seat to be checked depends on the result of the previous occupancy. Dependencies in the probability of occupancy are thus particularly advantageously taken into consideration. Thus, for example, the first seat to be evaluated on the rear bench may depend on the evaluation result of the passenger seat. If the passenger seat is occupied, for example, the seat behind the driver may be considered to be occupied with particularly high probability. This seat is therefore preferably evaluated particularly early. If the passenger seat is not occupied, for example, the seat behind the passenger seat may be considered to be occupied with particularly high probability. This seat is therefore preferably evaluated particularly early. It may be taken into consideration by this specific embodiment that occupants, for example, children, may be supervised upon the presence of a passenger, without disturbing the driver. Upon the absence of the passenger, the occupant may preferably sit behind the passenger seat, to be able to speak more easily with the driver, for example. It may therefore be advantageous to design the checking sequence dynamically depending on the already known occupancy.

Signals of sensors inside the motor vehicle are preferably recorded as measurement data. These may be measurement data of the following sensors, for example: an infrared sensor, an infrared camera, an optical camera, a light barrier, a weight sensor (in particular inside a seat), a sensor for (three-dimensional) depth measurement, a (three-dimensional) laser scanner, and/or a sound detector. A depth measurement may take place in particular with the aid of (a) stereo camera(s), a time-of-flight sensor, a LIDAR scanner, a radar sensor, and/or an ultrasonic sensor. Cameras used as sensors may be sensitive to visible light and/or nonvisible light (to humans), in particular to infrared light. In particular, the passenger compartment of the motor vehicle may be illuminated using infrared light for this purpose, without this being noticed by the occupants.

Weight sensors may be provided in the seats, for example. If the mass thus measured for a seat exceeds an established minimum value, the seat is thus preferably assumed to be occupied. Furthermore, for example, it may be differentiated using such weight sensors whether an adult or a child is sitting on the corresponding seat. If a child is thus recognized, for example, the triggering of an airbag may be suppressed for the corresponding seat in the event of an accident. This may be advantageous because an airbag may endanger rather than protect a child in particular in certain accident situations.

In another preferred specific embodiment of the method, the measurement data include at least one image of a passenger compartment camera.

The passenger compartment camera is preferably a CCD camera or a CMOS camera. In addition to a monocamera measurement, additionally or alternatively, a depth measurement is also possible using the passenger compartment camera, for example, by using (a) passenger compartment camera(s) designed as (a) stereo camera(s) or as (a) time-of-flight camera(s). To be able to save computing power, the passenger compartment camera is preferably configured to record black-and-white images. A piece of color information is not always required and could unnecessarily slow down an evaluation. Alternatively, for more accurate determination, however, items of color and/or infrared information may also be evaluated, whereby a still more accurate detection, classification, and/or identification of the seat occupancy may be possible. The passenger compartment camera is preferably situated and aligned in such a way that the occupancy of each seat of the motor vehicle may be recognized thereby. The method may thus be carried out using a single passenger compartment camera, so that costs and space for further sensors may be saved.

In another preferred specific embodiment of the method, in step b), a section of the image of the passenger compartment camera is evaluated in each case for the sequential checking of each individual seat.

The image of the passenger compartment camera is preferably divided into a plurality of sections, at least one section being associated with each seat. It is not necessary for the entire image of the passenger compartment camera to be used. There may thus also be areas of the image of the passenger compartment camera which are not associated with a seat and which are preferably not taken into consideration during an evaluation. There may also be sections which are used in multiple evaluations, which is advantageous in particular in the case of partial maskings of seats. It is also possible that sections overlap, to be able to be used ideally for the evaluation of a seat. A required computing power may thus be reduced.

The sections are preferably selected in such a way that an occupant on a seat in a typical sitting position at least partially and preferably completely fills up the corresponding section. If it is recognized for a section of the image of the passenger compartment camera that an object at least partially fills up the section, the corresponding seat is thus preferably assumed to be occupied. The image of the passenger compartment camera is preferably evaluated for this purpose using corresponding software.

Individual still images are preferably recorded and analyzed using the passenger compartment camera. A still image may be analyzed with less computing power in comparison to a moving image (i.e., a sequence of multiple still images).

Furthermore, it is preferred that the shape of an object in a section is analyzed. It may thus be differentiated, for example, whether a human or an object is located on a seat. If an object is thus recognized, for example, the triggering of an airbag may be suppressed in the event of an accident. If an airbag strikes an object, occupants of the motor vehicle may thus be endangered. It is also preferred that a movement of the object is analyzed, in particular for such a differentiation between a human and an object. If the recognized object moves, this may indicate that a human is located on the corresponding seat. In contrast, if the recognized object does not move, this may indicate an object. By detecting movements of objects, for example, it may also be recognized if an object is loaded into the motor vehicle and/or if a human gets in the motor vehicle. The detection of movements of objects may be carried out in particular by comparison of individual still images of the passenger compartment camera. To analyze a movement, preferably multiple (preferably 3 to 8) still images are recorded at fixed time intervals (preferably in the range of 0.1 to 2 seconds) using the passenger compartment camera and compared for an individual check.

Multiple sections of the image of the passenger compartment camera are preferably associated with each of the seats. It may thus be differentiated, for example, whether an adult or a child is sitting on the corresponding seat.

In another preferred specific embodiment, a classification is carried out with the aid of pattern recognition within one or multiple sections of a camera image. A classification of the occupancy and the occupying object may thus be carried out particularly robustly. A differentiation may thus take place, for example, between adult, child, baby seat, and object.

The sections of the image of the passenger compartment camera are preferably fixedly predefined. Alternatively, it is preferred that the sections are adapted to further pieces of information, which may indicate a seat occupancy. For example, if a minimum mass is measured using a weight sensor on a seat, this may indicate that a human is sitting on this seat. Using the passenger compartment camera, it may be differentiated in such a case whether a human or only a (sufficiently heavy) object is located on the seat. For the corresponding seat, for example, a larger section of the image of the passenger compartment camera may be checked, so that the shape of the human or the object may be analyzed.

In another preferred specific embodiment of the method, the checking sequence is stored in a control unit.

The control unit preferably includes at least one memory, in which the checking sequence is digitally stored. The checking sequence may be fixedly predefined or changeable. For example, the checking sequence may be changed by manual setting, for example, via an onboard computer or a diagnostic unit. The checking sequence may also be changed automatically by a predefined algorithm. For example, the checking sequence may be adapted using the algorithm while employing the above-described measurement data. If these measurement data indicate, for example, that a seat could be occupied, this seat is preferably checked rather than other seats. For this purpose, the control unit preferably has software, using which in particular the above-described measurement data may be evaluated.

Furthermore, it may be advantageous if other specifications, for example, legal maximum durations for the evaluation of a certain seat, are taken into consideration. These specifications may increase the value of the information of the occupancy and/or classification of the occupying object and are therefore preferably taken into consideration when preparing the checking sequence.

Furthermore, it is preferred that the control unit has at least one piece of software, which is intended and configured for the purpose of analyzing the image of the passenger compartment camera. This means, in particular, that preferably the seat occupancy may be recognized from the image of the passenger compartment camera using the control unit.

In another preferred specific embodiment of the method, prior to step a), it is checked for each seat whether an associated belt is closed, seats having a closed belt being checked last in step b).

The belt buckles preferably include sensors, using which it may be recognized whether a belt is closed or not. If a belt is thus recognized as closed, the corresponding seat may be considered to be occupied with great probability. This seat may be checked for occupancy at a lower priority than seats having an open belt. As described above, it is preferred to not classify seats having very high probability of occupancy into the checking sequence according to the probability of occupancy, but rather to place them at the end of the checking sequence, contrary to the arrangement of the seats according to decreasing probability of occupancy. This applies in particular to seats in which a belt is recognized as closed. In particular, in the case of an already closed belt, no warning signal is necessary, using which it is indicated that an occupant is not buckled up.

In another preferred specific embodiment of the method, in step a), a probability of occupancy is adapted on the basis of statistical usage data of prior uses of the motor vehicle.

In this specific embodiment, it is preferably recorded which seats of the motor vehicle are occupied at which point in time. For this purpose, for example, it may be stored for each seat (in particular in the control unit) by which fraction of a total operating duration or over a duration of driving cycles of the motor vehicle this seat was occupied. A fraction stored in this way may be used in step a) as a probability of occupancy of the seat. Furthermore, it is preferred that the seat occupancy (and in particular the corresponding fraction of the total operating duration of the motor vehicle) is stored as a function of further parameters. All variables which are determinable using sensors of the motor vehicle and on which the use of the motor vehicle may depend come into consideration as such parameters. Thus, for example, a probability of occupancy for each seat may be determined as a function of the time of day, the season, and/or the weather condition (which may be detected via a temperature sensor and/or via a rain sensor and/or weather maps). It may therefore be taken into consideration, for example, that in the event of bad weather and/or in winter, it may be more probable that children will sit on the rear seats. The time of day may also be taken into consideration. It may thus be, for example, that children sit on the rear seats in particular at certain times of day. The habits during the use of the vehicle are preferably taken into account (in particular by use of the statistical usage data).

In another preferred specific embodiment of the method, in step a), at least one of the following variables is used for adapting the probability of occupancy:
- pieces of information about the use of a seat heater,
- pieces of information about the adjustment of a seat position,
- pieces of information on the use of operating elements of the motor vehicle which are situated in the vicinity of the seat,
- pieces of information about the use of a power window lift,
- pieces of information about the position of noise sources,
- pieces of information about the opening and/or closing of a door.

The mentioned pieces of information may indicate that a seat is occupied. The seat heater and the adjustment of the seat position are typically used when the corresponding seat is occupied. If an operating element is actuated which is (only) reachable from one seat, this may thus indicate the occupancy of the corresponding seat. An operating element being situated in the vicinity of a seat is in particular to be understood in such a way that an occupant on the corresponding seat may actuate the operating element or the operating element is configured and intended for the purpose of being actuated by the occupant on this seat. If a reading lamp is turned on, for example, this may indicate the occupancy of a certain seat. It may also indicate the occupancy of a seat if a button for actuating the power window lift is pressed. If noises in the motor vehicle are detected (for example, via a microphone), this may thus indicate that a human is located at the corresponding position, from which the noise originates. Noises may be located by a plurality of microphones. The opening and/or closing of the doors of the motor vehicle is/are preferably electronically monitored. If a door is opened, this may indicate a change of the seat occupancy of the corresponding seat. As long as a door is not opened, the seat occupancy of the corresponding seat may be assumed to be unchanged.

If there are indications that a seat may be occupied, this seat is preferably given priority in the checking. This means that a greater probability of occupancy is preferably assumed for the corresponding seat in step a).

In another preferred specific embodiment of the method, immediately after a start of the motor vehicle, an initial seat occupancy is recognized, it being periodically checked during the operation of the motor vehicle whether a change of the seat occupancy has taken place.

The initial seat occupancy is the seat occupancy which exists immediately after the start of the motor vehicle, i.e., in particular immediately after an internal combustion engine or another drive engine of the motor vehicle is turned on. The recognition of the initial seat occupancy is preferably completed as quickly as possible after the start of the motor vehicle. A warning signal may therefore be output preferably quickly if necessary after the start, if an occupant is not buckled up. Such a warning signal preferably takes place at latest one second after the start of the motor vehicle, so that the relevant occupant may buckle up, for example, before the motor vehicle starts moving or before the motor vehicle reaches a (definable) minimum velocity. The warning signal is preferably not output before the minimum velocity has been reached for the first time after the start of the motor vehicle. The check of the initial seat occupancy preferably includes at least carrying out steps a) and b) one time.

It may be presumed that there is only a minor probability that the seat occupancy changes during the operation of the motor vehicle. Therefore, it is preferably periodically checked after recognition of the initial seat occupancy whether a change of the seat occupancy has taken place. A check of the seat occupancy is preferably carried out after each passage of an established time interval. Such a check preferably includes at least carrying out steps a) and b). In step a), a seat occupancy recognized during a prior check is preferably taken into consideration. In particular, the probability of occupancy of a seat may be assumed to be particularly high if this seat was recognized as occupied during the prior check.

The time interval between successive checks preferably has a length in the range of 1 to 20 seconds, in particular in the range of 5 to 10 seconds. It is preferred that the length of the time interval is selected at least as a function of one of the following parameters or events: a velocity of the motor vehicle, a duration of a driving state, opening or closing a belt, opening or closing a door, a change of a signal of a weight sensor in a seat, an actuation of an operating element, turning on or off a seat heater, an adjustment of a seat position, and/or an actuation of a power window lift. If the motor vehicle moves, for example, over a longer period of time at high velocity, it may thus be assumed, for example, that the motor vehicle is traveling on a highway. In such a driving state, a longer time interval may be selected, because a change of the seat occupancy is improbable. In contrast, if a door is opened when the motor vehicle is at a standstill, a change of the seat occupancy may thus be assumed to be very probable. It is particularly preferred that the time interval corresponds to the duration of a single check, so that after completion of one check, the next check begins without waiting time.

A computer program is also to be described here, which is configured to carry out all steps of the method, and a machine-readable storage medium on which this computer program is stored.

Further details of the present invention and an exemplary embodiment, to which the present invention is not restricted, however, are explained in greater detail based on the FIGURE.

BRIEF DESCRIPTION OF THE DRAWING

FIG. 1 shows a schematic flow chart of a method for recognizing a seat occupancy of seats in a motor vehicle.

DETAILED DESCRIPTION OF EXAMPLE EMBODIMENTS

FIG. 1 shows a schematic flow chart of the described method. After motor vehicle has been started at I, the seats of the motor vehicle are initially classified according to step a) according to decreasing probability of occupancy. In this example, the checking sequence is: driver's seat, passenger seat, rear seats. Subsequently, a sequential check of the occupancy of the seats is carried out in the checking sequence according to step b). It is initially differentiated in step b) whether a belt of the driver's seat is closed. If this is not the case (path VI), the driver's seat is checked first at VII. Depending on the result of this check, a warning signal is output for the driver's seat if necessary at X. However, if the belt of the driver is closed, no check of the driver's seat takes place and the check of the passenger seat begins at VIII (path V). The check of the rear seats subsequently follows at IX. A warning signal is also output in each case for the passenger seat and the rear seats if necessary at X. Steps a) and b), which are carried out after the start of the motor vehicle at I, together form a check of an initial seat occupancy II.

After the check of initial seat occupancy II, a periodic check III follows. Periodic check III includes steps a) and b), which are carried out alternately. It is shown as step b) that the seats are checked in the following sequence: driver's seat VII, rear seats IX, passenger seat VIII. After each time step b) is carried out, according to step a), the checking sequence is established again, so that the illustration of step b) is thus only by way of example. A warning signal X is also output if necessary in step b) during periodic check III, if a seat is occupied and the corresponding belt is not closed. Periodic check III is carried out up to a shutdown of the motor vehicle at IV.

What is claimed is:

1. A method for recognizing a seat occupancy of seats in a motor vehicle, comprising:
   a) preparing a checking sequence of the seats using respective probabilities of occupancy of the seats, the checking sequence defining a sequence order for checking the seat occupancy of the seats, the sequence order being in decreasing occupancy probability order; and
   b) sequentially checking, by a control unit using sensors in the motor vehicle, the seat occupancy of each respective one of the seats, one after the other, in the sequence order defined by the checking sequence in the decreasing occupancy probability order;
   wherein the checking includes outputting a warning signal depending on a result of the checking and based on a status of a safety belt at the respective seat.

2. The method as recited in claim 1, wherein measurement data are obtained prior to step b), which are evaluated for the checking of the occupancy in step b).

3. The method as recited in claim 2, wherein the measurement data include at least one image of a passenger compartment camera.

4. The method as recited in claim 3, wherein in step b), a section of the image of the passenger compartment camera is evaluated for the sequential checking of each individual seat.

5. The method as recited in claim 1, wherein the checking sequence is stored in a memory of the control unit.

6. The method as recited in claim 1, wherein prior to step a), it is checked for each respective one of the seats whether the safety belt at the respective seat is closed, and seats having a closed belt are checked last in step b).

7. The method as recited in claim 1, wherein in step a), the respective probabilities of occupancy of the seats are adapted based on statistical usage data of preceding uses of the motor vehicle.

8. The method as recited in claim 1, wherein in step a) at least one of the following variables is used for adapting the probabilities of occupancy:
   pieces of information about use of a seat heater,
   pieces of information about an adjustment of a seat position,
   information on use of operating elements in the motor vehicle, which are situated in a vicinity of the seat,
   pieces of information about use of a power window lift,
   pieces of information about a position of noise sources, and
   pieces of information about an opening and/or closing of a door.

9. The method as recited in claim 1, wherein immediately after a start of the motor vehicle, an initial seat occupancy is recognized, and during the operation of the motor vehicle, it is periodically checked whether a change of the seat occupancy has taken place.

10. The method as recited in claim 1, further comprising:
    recording the seat occupancy of each of the seats based on the checking; and
    triggering safety systems of the motor vehicle as a function of the seat occupancy of each of the seats.

11. The method as recited in claim 10, wherein the triggering occurs in an event of a collision of the motor vehicle with a collision object.

12. The method as recited in claim 1 wherein the status of the safety belt is open or closed.

13. A control unit for a motor vehicle, which is configured for recognizing a seat occupancy of seats in a motor vehicle, the control unit configured to:
    a) prepare a checking sequence of the seats using respective probabilities of occupancy of the seats, the checking sequence defining a sequence order for checking the seat occupancy of the seats, the sequence order being in decreasing occupancy probability order; and
    b) sequentially check, by the control unit using sensors in the motor vehicle, the seat occupancy of each respective one of the seats, one after the other, in the sequence order defined by the checking sequence in the decreasing occupancy probability order;
    wherein the check includes outputting a warning signal depending on a result of the checking and based on a status of a safety belt at the respective seat.

14. The control unit as recited in claim 13, wherein the control unit is further configured to:
    record the seat occupancy of each of the seats based on the checking; and
    trigger safety systems of the motor vehicle as a function of the seat occupancy of each of the seats.

15. The control unit as recited in claim 14, wherein the triggering occurs in an event of a collision of the motor vehicle with a collision object.

16. A non-transitory machine-readable storage medium on which is stored a computer program for recognizing a seat occupancy of seats in a motor vehicle, the computer program, when executed by a processor, causing the processor to perform:
    a) preparing a checking sequence of the seats using respective probabilities of occupancy of the seats, the checking sequence defining a sequence order for checking the seat occupancy of the seats, the sequence order being in decreasing occupancy probability order; and
    b) sequentially checking, by a control unit using sensors in the motor vehicle, the seat occupancy of each respective one of the seats, one after the other, in the sequence order defined by the checking sequence in the decreasing occupancy probability order;
    wherein the checking includes outputting a warning signal depending on a result of the checking and based on a status of a safety belt at the respective seat.

17. The non-transitory machine-readable storage medium as recited in claim 16, wherein the computer program, when executed by the processor, further causing the processor to perform:
    recording the seat occupancy of each of the seats based on the checking; and
    triggering safety systems of the motor vehicle as a function of the seat occupancy of each of the seats.

18. The non-transitory machine-readable storage medium as recited in claim 17, wherein the triggering occurs in an event of a collision of the motor vehicle with a collision object.

\* \* \* \* \*